US 9,332,206 B2

(12) United States Patent
Rodrigues et al.

(10) Patent No.: US 9,332,206 B2
(45) Date of Patent: May 3, 2016

(54) FRAME SHARING

(75) Inventors: Ruchir Rodrigues, Dallas, TX (US);
Kristopher T. Frazier, Frisco, TX (US);
Lonnie Hiroshi Katai, Murphy, TX
(US); Alison Kay Allen, Dallas, TX
(US); Jayson D. Sellers, Flower Mound,
TX (US); John Stanley Chittenden,
Grapevine, TX (US)

(73) Assignee: **VERIZON PATENT AND
LICENSING INC.**, Basking Ridge, NJ
(US)

( * ) Notice: Subject to any disclaimer, the term of this
patent is extended or adjusted under 35
U.S.C. 154(b) by 1164 days.

(21) Appl. No.: 12/903,485

(22) Filed: Oct. 13, 2010

(65) Prior Publication Data

US 2012/0096501 A1 Apr. 19, 2012

(51) Int. Cl.
| | |
|---|---|
| H04N 21/262 | (2011.01) |
| H04N 21/2662 | (2011.01) |
| H04N 21/422 | (2011.01) |
| H04N 21/431 | (2011.01) |
| H04N 21/442 | (2011.01) |
| H04N 21/472 | (2011.01) |
| H04N 21/647 | (2011.01) |
| H04N 5/44 | (2011.01) |
| H04N 21/4788 | (2011.01) |
| H04N 21/81 | (2011.01) |

(52) U.S. Cl.
CPC ......... *H04N 5/4448* (2013.01); *H04N 21/4788*
(2013.01); *H04N 21/8153* (2013.01)

(58) Field of Classification Search
None
See application file for complete search history.

(56) References Cited

U.S. PATENT DOCUMENTS

| | | | |
|---|---|---|---|
| 2003/0177495 A1* | 9/2003 | Needham | H04N 5/44543 725/55 |
| 2007/0162667 A1* | 7/2007 | Kim | G06F 3/0482 710/62 |
| 2008/0109851 A1* | 5/2008 | Heather | G06Q 30/0603 725/60 |
| 2011/0292245 A1* | 12/2011 | Deever | G11B 27/034 348/231.2 |
| 2013/0014159 A1* | 1/2013 | Wiser et al. | 725/34 |
| 2014/0033252 A1* | 1/2014 | Radloff | H04N 5/445 725/35 |

* cited by examiner

Primary Examiner — Brian T Pendleton
Assistant Examiner — Jean D Saint Cyr

(57) ABSTRACT

A method including providing television content (TC) to a user; receiving a TC capture request; capturing TC frames based on the TC capture request; displaying to the user one or more TC frames included in the captured TC frames; receiving a user selection of one or more TC frames included in the displayed one or more TC frames; receiving a user selection of one or more destinations to send the selected one or more TC frames; and sending the selected one or more TC frames to the one or more destinations.

20 Claims, 14 Drawing Sheets

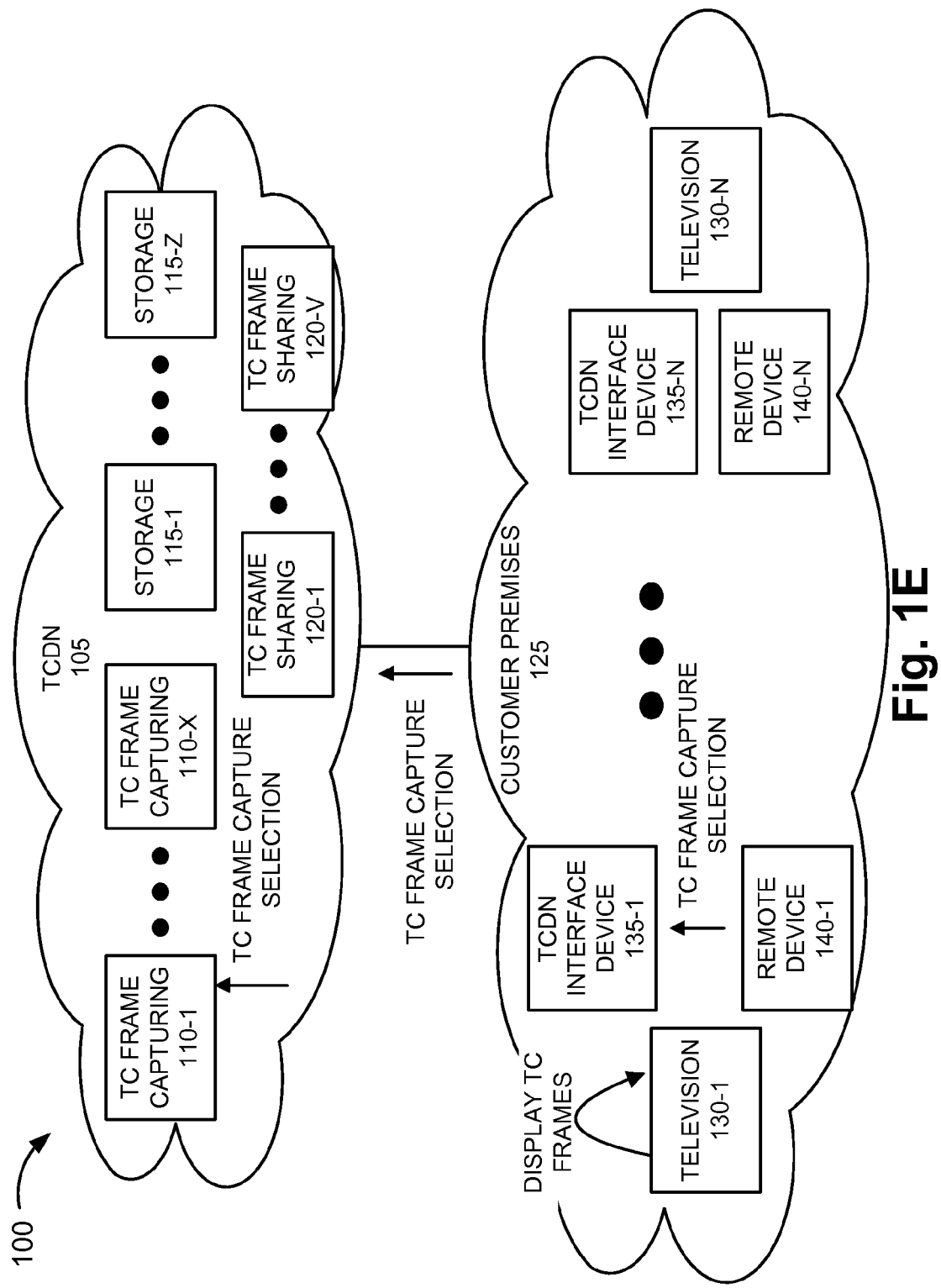

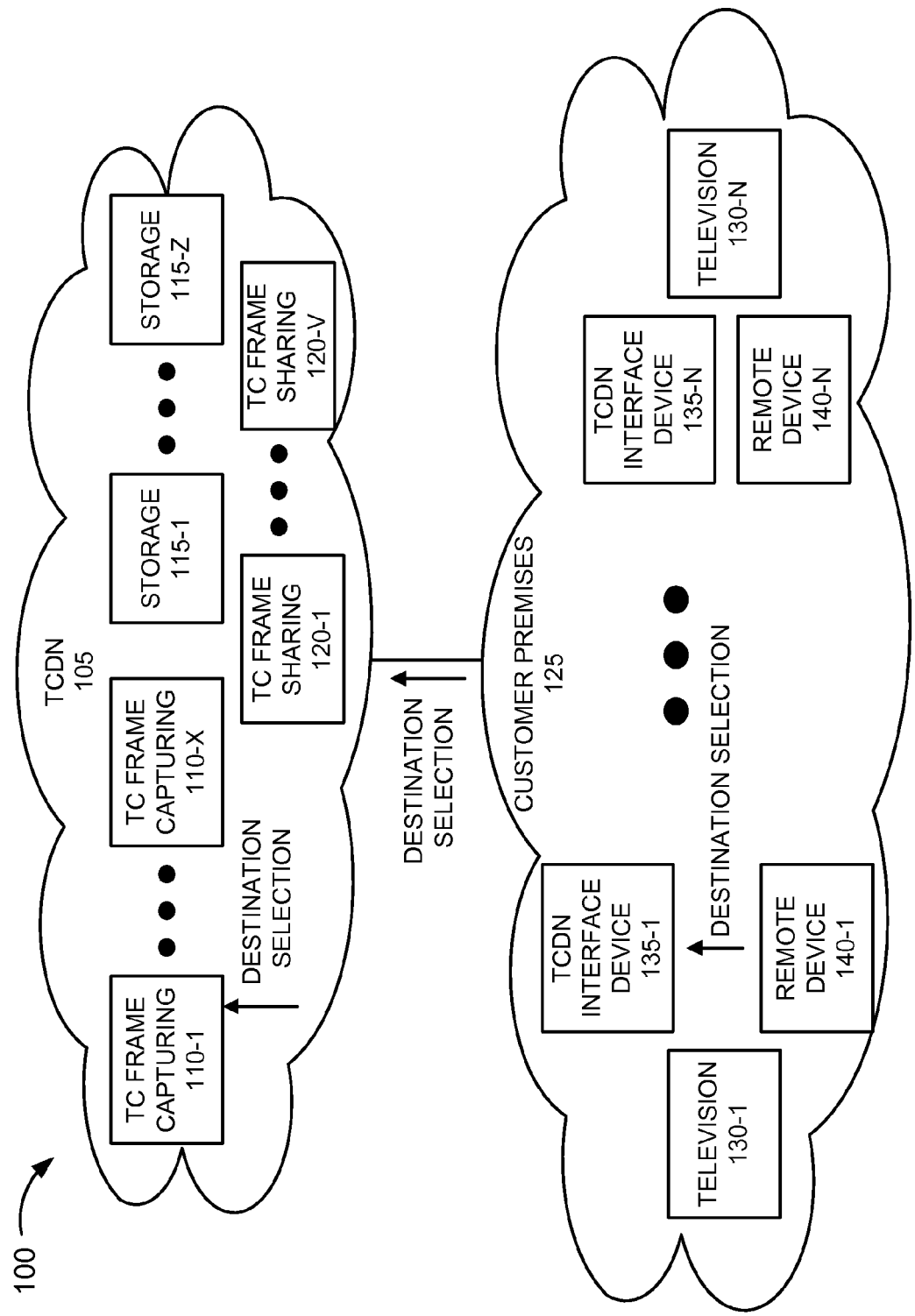

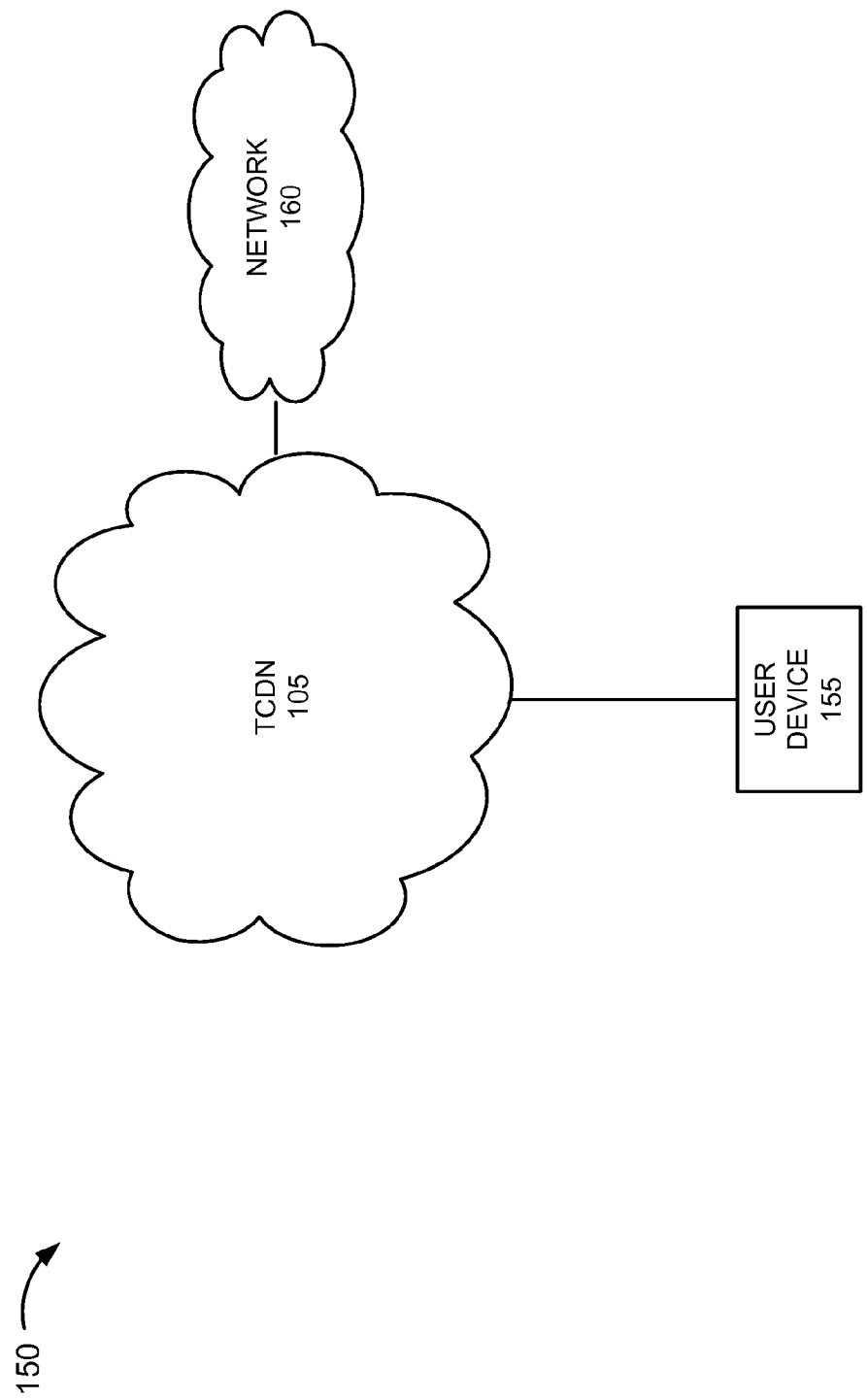

FRAME SHARING

BACKGROUND

Interactive television content has become an attraction to television content viewers since it provides a two-way communication platform. For example, interactive television content may include graphical information elements, such as, icons, banners, menus, overlays, and widgets to allow the television content viewer to interact with this content and navigate to other television content. Television service providers, content providers, and advertisers continue to aim toward enhancing a television content viewer's experience by supplementing linear programming with interactive features.

BRIEF DESCRIPTION OF THE DRAWINGS

FIGS. 1B-1G are diagrams illustrating an exemplary process for television content frame capturing and sharing according to an exemplary embodiment;

FIG. 1H is a diagram illustrating another exemplary environment in which an exemplary embodiment for providing television content frame capturing and sharing may be implemented;

DETAILED DESCRIPTION OF PREFERRED EMBODIMENTS

Figure 1A:
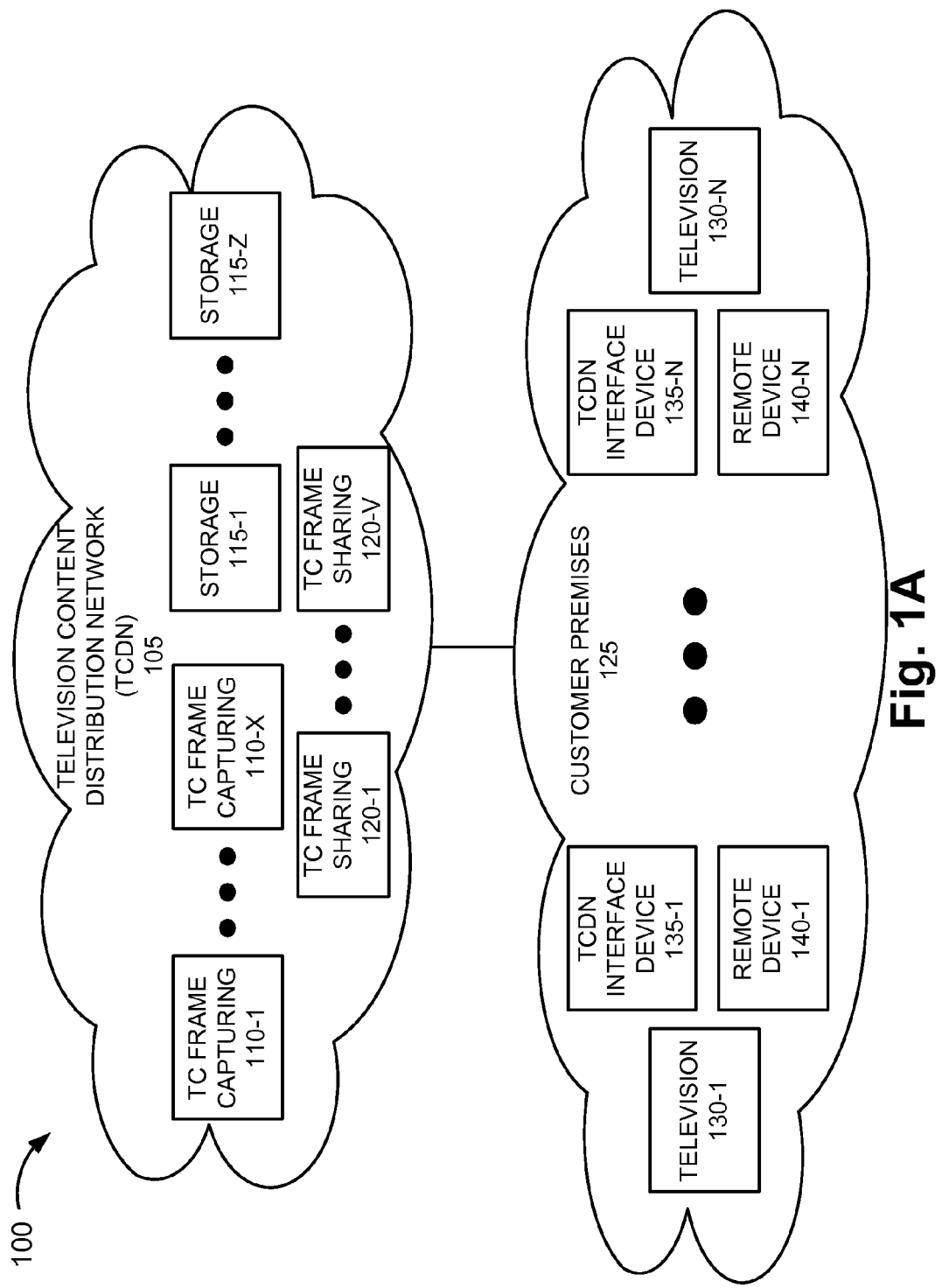
FIG. 1A is a diagram illustrating an exemplary environment in which an exemplary embodiment for providing television content frame capturing and sharing may be implemented.

The following detailed description refers to the accompanying drawings. The same reference numbers in different drawings may identify the same or similar elements. Also, the following detailed description does not limit the invention.

The term "television content" or "TC," as used herein, is intended to be broadly interpreted to include, for example, visual data or visual data and audio data, such as user interfaces (UIs) and media content. By way of example, television content may include television programming (e.g., local programming, national programming, free programming, live-programming (e.g., a live broadcast, etc.), etc.), movies, sports, news, video-on-demand content, premium channel content, television guides, weather information, sports information, traffic information, horoscope information, games, etc. The source of the television content may include a television content distribution network (TCDN).

According to exemplary embodiments described herein, television content frames (TC frames) may be captured and shared with others. According to an exemplary embodiment, a TCDN and customer premises equipment may allow a user to capture TC frames from TC, allow the user to select TC frame(s) from the captured TC frames, and share the selected TC frame(s) with others. According to an exemplary embodiment, the TCDN may include a device that captures a time window of TC frames. According to another exemplary embodiment, the customer premises may include a device that captures a time window of TC frames. According to an exemplary embodiment, the device may continuously capture TC frames. The time window in which TC frames may be captured may be predefined by the TC service provider or user-configurable. According to an exemplary embodiment, a user may provide a TC frame capture request to the TCDN (e.g. the device that captures TC frames) or the customer premises device. In response, the captured TC frame(s) may be provided (e.g., stored, displayed) to the user.

The user may then review the captured TC frames and select TC frame(s) to share with others. By way of example, the user may share the selected TC frame(s) on Internet sites (e.g., social networking sites, such as for example, Facebook, Twitter, other types of web sites, etc.), with a user-defined user group, by sending the selected TC frame(s) to others via e-mail, multimedia messaging service (MMS) messages, etc., or to some other type of destination. According to an exemplary embodiment, a UI (e.g., a graphical user interface (GUI)) may be displayed to the user to provide one or more operations associated with the capturing and sharing of TC frame(s).

According to another exemplary embodiment, a user device may allow the user to capture TC frames from TC, allow the user to select TC frame(s), and share the selected TC frame(s) with others. The term "user device," as used herein, is intended to be broadly interpreted to include, for example, a mobile device, a stationary device, a handheld device, or a portable device. For example, the user device may include a computational device (e.g., a desktop computer, a laptop computer, a palmtop computer, etc.), a communication device (e.g., a wireless phone, a wired phone, an Internet-access device, etc.), a gaming device, a multimedia device, a data organizing device (e.g., a personal digital assistant (PDA), and/or some other type of user device. According to other embodiments, the user device and one or more other devices (e.g., a TCDN network, a consumer device, etc.) may allow the user to capture TC frames from TC, allow the user to select TC frame(s), and share the selected TC frame(s) with others.

FIG. 1A is a diagram illustrating an exemplary environment 100 in which an exemplary embodiment for providing television content frame capturing and sharing may be implemented. As illustrated in FIG. 1A, environment 100 may include a TCDN 105 and customer premises 125. TCDN 105 may include, among other devices, one or multiple TC frame capturing devices 110-1 through 110-X (referred to generally as TCFC 110 or TCFCs 110), one or multiple storages 115-1 through 115-Z (referred to generally as storage 115 or storages 115), and one or multiple TC frame sharing devices 120-1 through 120-V (referred to generally as TC frame sharing device 120 or TC frame sharing devices 120). Customer premises 125 may include, among other devices, televisions (TVs) 130-1 through 130-N (referred to generally as TV 130 or TVs 130), TCDN interface devices 135-1 through 135-N (referred to generally as TCDN interface device 135 or TCDN interface devices 135), and remote devices 140-1 through 140-N (referred to generally as remote device 140 or remote devices 140).

The number of devices and networks, and configuration in environment 100 is exemplary and provided for simplicity. In practice, environment 100 may include additional devices, fewer devices, different devices, and/or differently arranged devices, than those illustrated in FIG. 1A. For example, TCDN interface device 135 and TV 130 may be implemented as a part of a computer system (e.g., a TV tuner card, a cable card, a display, etc.) or a communication device (e.g., a tablet device, a mobile device, a user device, etc.). Additionally, or alternatively, in practice, environment 100 may include additional networks, fewer networks, and/or differently arranged networks, than those illustrated in FIG. 1A. Also, one or more functions and/or processes described as being performed by a particular device may be performed by a different device, or some combination of devices, according to other embodiments. For example, according to other embodiments, TCFC 110 may perform some or all of the functions/processes associated with TC frame sharing device 120. Environment 100 may include wired and/or wireless connections among the devices illustrated.

TCDN 105 may include a network that distributes or makes available television content. TCDN 105 may correspond to a satellite-based network and/or a terrestrial-based network. Although not illustrated, TCDN 105 may include, for example, television content distribution devices, television content storage devices, etc. According to some embodiments, for example, TCDN 105 may include a network associated with a television service provider (TSP). According to other embodiments, for example, TCDN 105 may include a network such as the Internet, a web site, etc.

TCFC 110 may capture TC frames. TCFC 110 may be included with various types of television content distribution devices and/or television content storage devices. By way of example, TCFC 110 may be included with a server-based device, a proxy device, a gateway device, a storage device, and/or a routing device. According to an exemplary embodiment, TCFC 110 may capture TC frames within a particular time window and/or may capture a particular number of TC frames based on a user's TC frame capture request.

TCFC 110 may store the captured TC frames (e.g., storage 115, TCDN interface device 135, etc.).

Storage 115 may store TC content associated with users. For example, storage 115 may store TC frames captured on behalf of a user or TC frames selected by a user. Storage 115 may store other types of information associated with users.

TC frame sharing device 120 may manage the sharing of TC frames. For example, TC frame sharing device 120 may communicate with e-mail servers, multimedia messaging service (MMS) servers, Internet sites, and other destinations to allow TC frames selected by the user to be posted, transmitted to other users in a message, etc. TC frame sharing device 120 may perform various security measures (e.g., authentication, etc.) to access and log into various user accounts, perform user verification, etc. TC frame sharing device 120 may also provide other services, such as, for example, graphical processing (e.g., water-marking, etc.) to address any copyright issues. TC frame sharing device 120 may also package TC frames with other data (e.g., text objects, audio data, etc.) that the user may wish to include with the TC frames.

Customer premises 125 may include devices that allow users to receive television services from TCDN 105. As illustrated, customer premises 125 may include exemplary customer premise equipment, such as, for example, TCDN interface devices 135, televisions 130, and remote devices 140.

TV 130 may include a device to display television content. According to an exemplary embodiment, TV 130 may correspond to a television. According to other embodiments, TV 130 may correspond to other types of devices, such as, for example, a monitor, a mobile device having a display, a laptop computer, etc. According to an exemplary embodiment, TV 130 and TCDN interface device 135 may be separate devices, as illustrated in FIG. 1A. According to other embodiments, TV 130 may include TCDN interface device 135 or include some of the functionalities associated with TCDN interface device 135.

TCDN interface device 135 may include a device that communicates with TCDN 105 to provide television services and/or television content to a user. TCDN interface device 135 may also communicate with TCDN 105 to provide other types of services, assets, resources, etc. For example, TCDN interface device 135 may allow a user to communicate with other types of networks. According to an exemplary embodiment, TCDN interface device 135 may include a client, a thin client, a set-top box, a converter box, a receiver, a tuner, and/or a digibox. According to an exemplary embodiment, TCDN interface device 135 may also include a digital video recorder (DVR) and/or a hard drive.

Remote device 140 may include a device that communicates with TV 130 and/or TCDN interface device 135 to allow a user to interact with TCDN interface device 135 and/or TV 130. Remove device 140 may also include a device that communicates with other devices in communication with TV 130 and/or TCDN interface device 135. Remote device 140 may include one or multiple input mechanisms (e.g., buttons, a display, a touchpad, a microphone, etc.) to receive a user's input and, among other things, allow the user to use TC frame capturing and sharing features. According to an exemplary embodiment, remote device 140 may correspond to a remote control device (e.g., a set-top box controller, a TV controller, a converter box controller, etc.). According to other embodiments, remote device 140 may correspond to, for example, a tablet device, a mobile communication device, or some other type of user device. According to still other embodiments, remote device 140 may include TV 130. According to yet other embodiments, remote device 140 may include TV 130 and TCDN interface device 135 or include some of the functionalities associated with TCDN interface device 135.

FIGS. 1B-1G are diagrams illustrating an exemplary process for TC frame capturing and sharing according to an exemplary embodiment. While particular messages or information may be illustrated as being sent by or received by a particular device in environment 100, according to other embodiments, the exemplary messages may be sent by or received by a different device or a combination of devices.

Figure 1B:
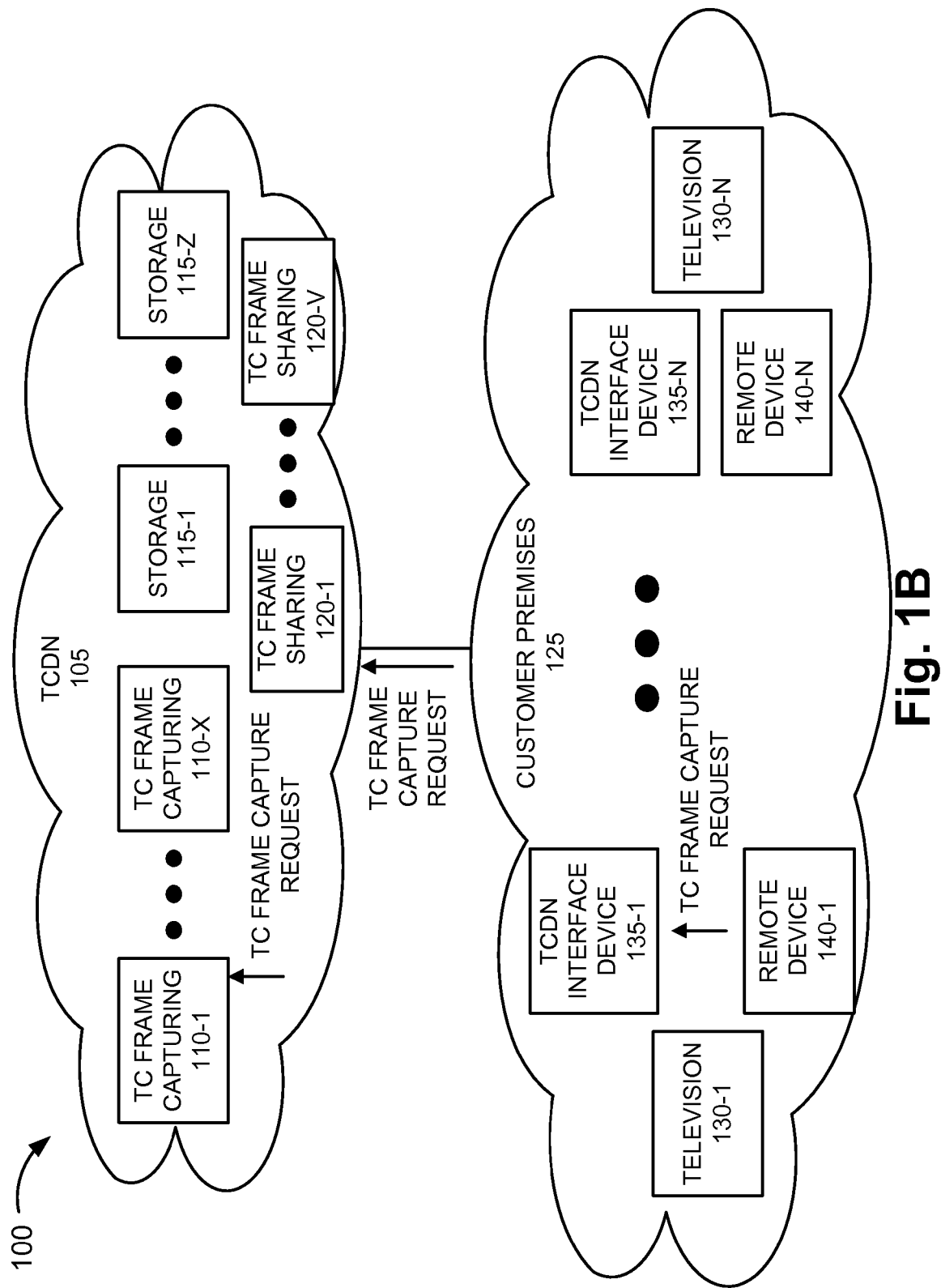

Referring to FIG. 1B, according to an exemplary process, it may be assumed that a user (not illustrated) is watching television content (e.g., a movie). The user may provide an input to remote device 140-1 that causes remote device 140-1 to send a TC frame capture request to TCDN interface device 135-1. As further illustrated, the TC frame capture request may be sent to TCFC 110-1 in TCDN 105.

Figure 1C:
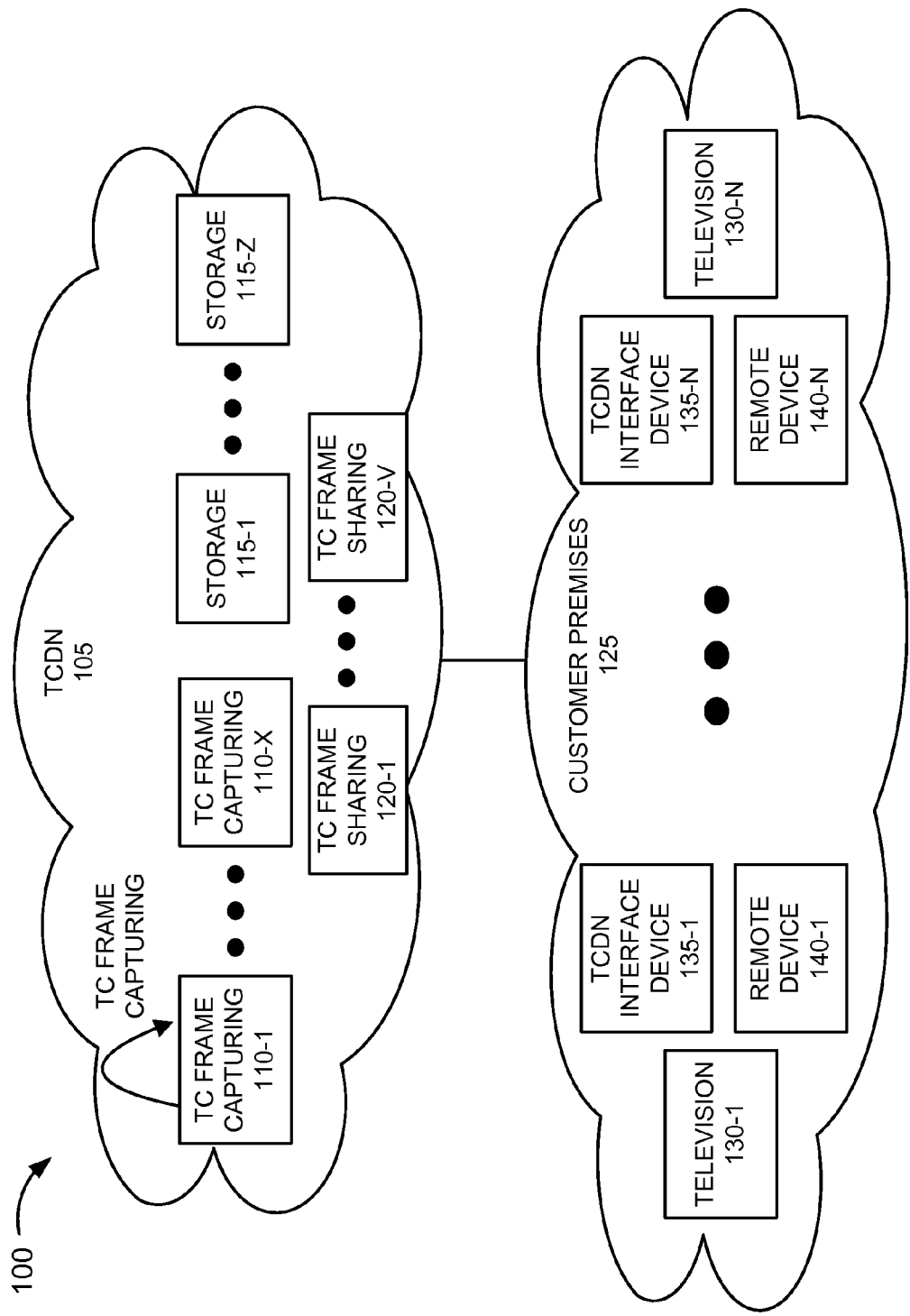

As illustrated in FIG. 1C, according to the exemplary process, TCFC 110-1 may capture a time window of TC frames. For example, TCFC 110-1 may continuously store a time window of TC frames from TC provided to users.

According to an exemplary embodiment, the user may send a TC frame capture request that relates to the capture of TC frames that the user has seen during the provisioning of the television content. According to another exemplary embodiment, the user may send a TC frame capture request that relates to the capture of TC frames that the user expects to see during the provisioning of the television content. According to yet other embodiments, the user may send a TC frame capture request that relates to the capture of TC frames within some other time window relative to receiving the TC frame capture request. For example, the time window may include a portion of time before receiving the TC frame capture request and a portion of time after receiving the TC frame capture request.

According to an exemplary embodiment, the duration of the time window for capturing TC frames may be the same as the time window associated with the TC frame capture request. According to another exemplary embodiment, the time window for capturing TC frames may be different from the time window associated with the TC frame capture request. For example, TCFC 110-1 may capture TC frames for a first time period (e.g., a minute, etc.) and the time window associated with the TC frame capture request may be a shorter time period (e.g., 30 seconds, etc.). The number of TC frames/time window, a duration of the time window for capturing TC frames, a duration of the time window associated with a TC frame capture request, etc., may be user-configurable (e.g., user preferences) or predefined in TCDN 105. Additionally, according to some embodiments, the number of frames/time window and/or the duration of the time windows may each have multiple available settings.

Figure 1D:
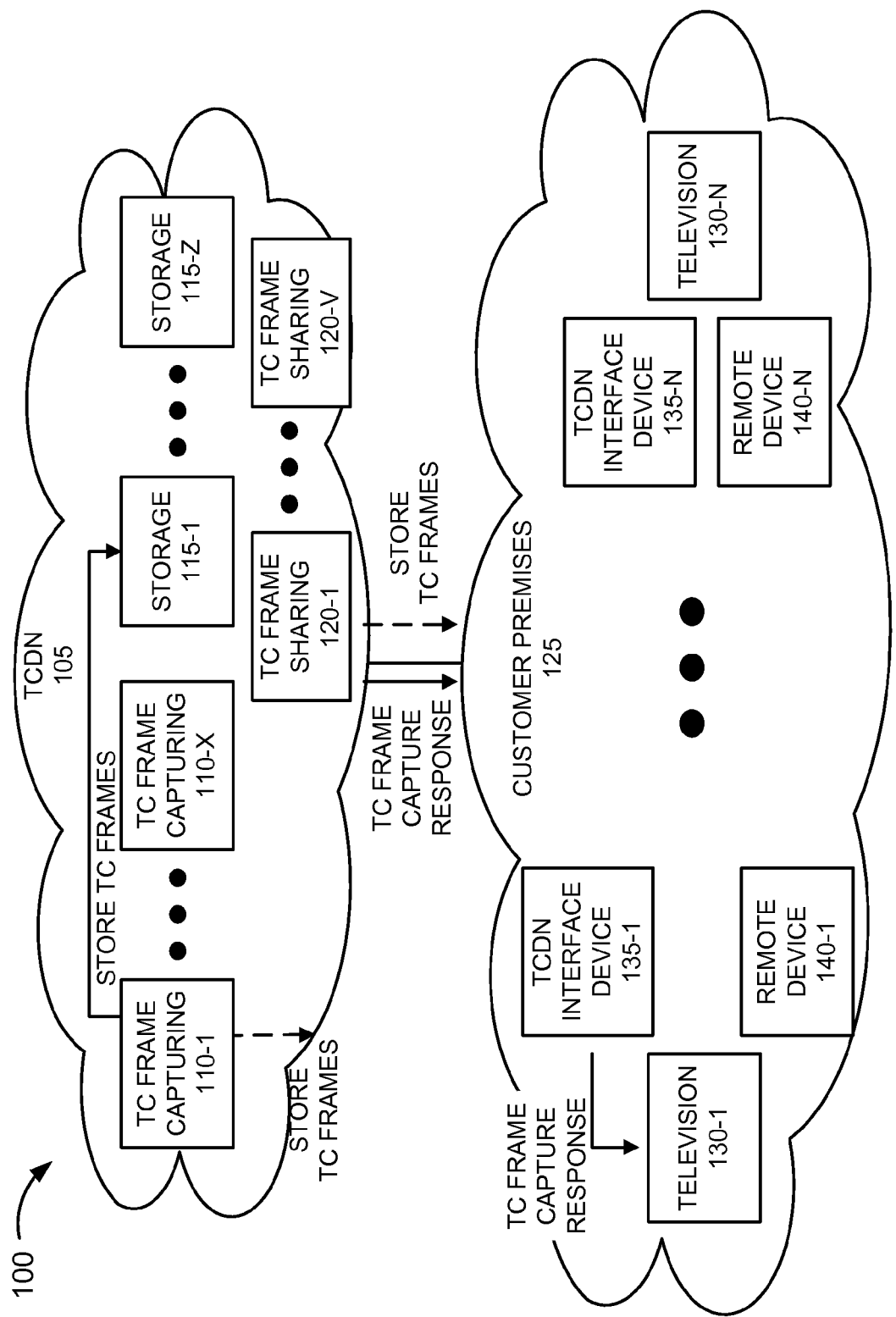

Referring to FIG. 1D, according to the exemplary process, TCFC 110-1 may store the captured TC frames in storage 115-1. According to another exemplary embodiment, the captured TC frames may be stored elsewhere (e.g., TCDN interface device 135-1, TV 130-1, remote device 140-1). Additionally, as illustrated in FIG. 1D, TCDN 105 may send a TC frame capture response to the user. By way of example, the TC frame capture response may be displayed on TV 130-1. For example, TV 130-1 may display a GUI that allows the user to see the captured TC frames, as illustrated in FIG. 1E. In this example, the user may decide to review the captured TC frames in order to send one or more of the captured TC frames to his/her friend(s). According to another scenario, the user may store the captured TC frames for review at a later time. According to the exemplary process, it may be assumed that the user selects several TC frames via remote device 140-1 and TC frame capture selections may be received by TCDN interface device 135-1 and TCFC 110-1, as illustrated in FIG. 1E.

Referring to FIG. 1F, according to the exemplary process, it may be assumed that the user selects a destination to which the several TC frames selected may be shared. For example, the user may select names of people, social networking sites, communication addresses (e.g., e-mail addresses, MMS messages, etc.), user group names, and/or some other type of destination data that permits the several TC frames selected to be shared with that destination. The user may select different TC frames for different destinations, select the same TC frames for all destination(s), etc. Additionally, according to an exemplary embodiment, the user may create a message and/or add other content (e.g., textual content, audio content) with selected TC frames to be shared. By way of example, the user may wish to add the name of the television content, the episode, description of the scene illustrated in the TC frames, or some other type of commentary, etc. As illustrated, a destination selection may be received by TCDN interface device 135-1 and TCFC 110-1.

Figure 1G:
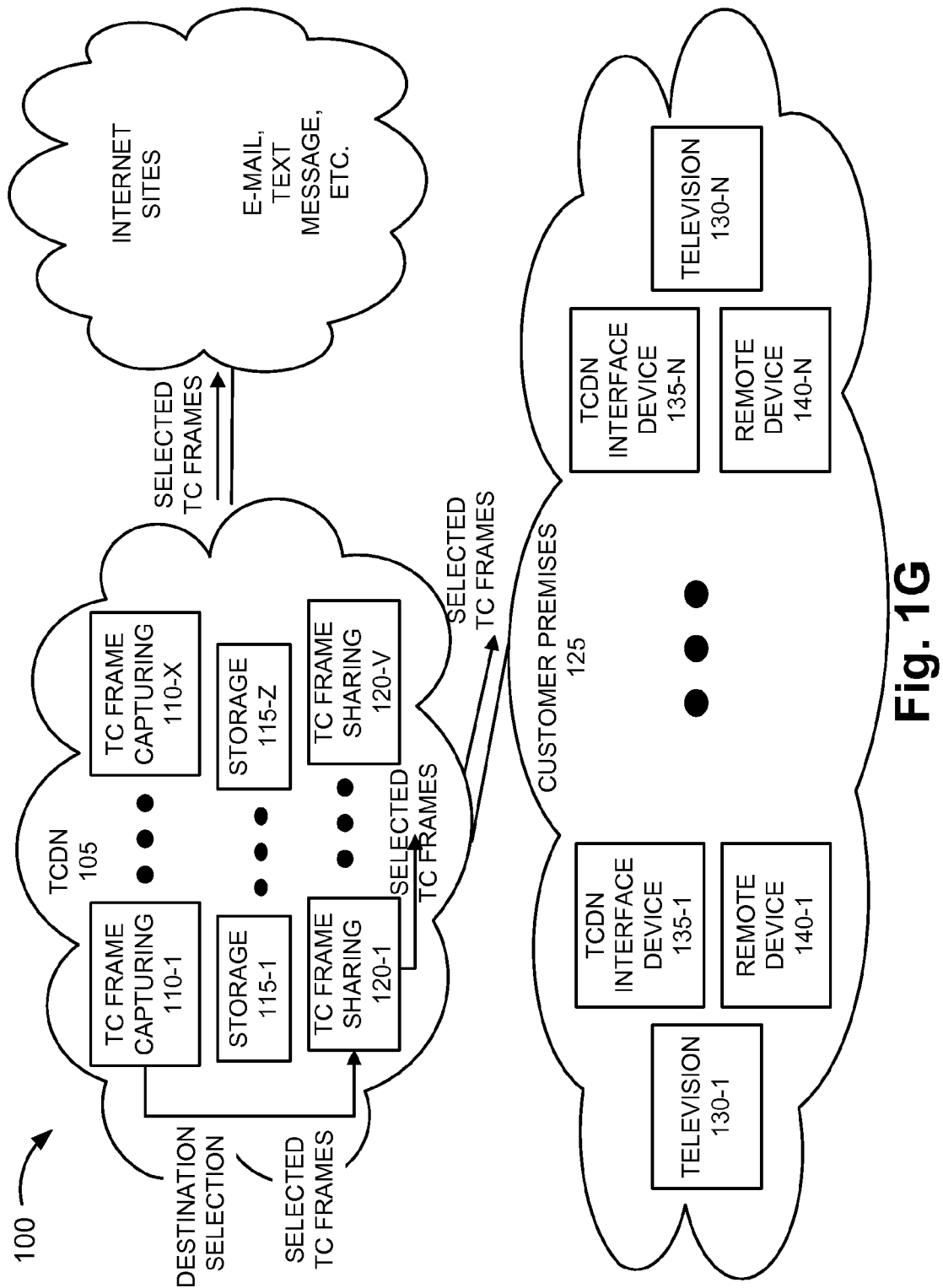

As illustrated in FIG. 1G, the selected TC frames may be sent to various destinations. For example, TCFC 110-1 may provide or identify the user's destination selection and the selected TC frames to TC frame sharing device 120-1. TC frame sharing device 120-1 may then manage the sharing of TC frames selected by the user. By way of example, the selected TC frames may be sent to Internet sites, sent to various individuals as an e-mail or a text message (e.g., MMS message, etc.), or sent to other users (e.g., subscribers of the TSP). According to some embodiments, TCDN 105 may include one or more types of communication servers (e.g., e-mail servers, MMS servers, etc.) for its users.

FIG. 1H is a diagram illustrating another exemplary environment 150 in which an exemplary embodiment for providing television content frame capturing and sharing may be implemented. As illustrated in FIG. 1H, environment 150 may include TCDN 105, a user device 155, and a network 160. The number of devices and networks, and configuration in environment 150 is exemplary and provided for simplicity.

In practice, environment 150 may include additional devices, different devices, and/or differently arranged devices, than those illustrated in FIG. 1H. For example, TCDN 105 may include a device(s) that performs one or more processes associated with the capturing and sharing of television content. Additionally, or alternatively, user device 155 in combination with other device(s) (e.g., TCDN interface device 135, a wireless router, a server, a consumer device, etc.) not included in TCDN 105 may perform one or more processes associated with the capturing and sharing of television content. Additionally, or alternatively, in practice, environment 150 may include additional networks, etc., and/or differently arranged networks, than those illustrated in FIG. 1H. Network 160 may include one or multiple networks of any type. Network 160 may provide a communication path to destinations selected by the user. Environment 150 may include wired and/or wireless connections between user device 155 and devices within or between TCDN 105 and/or network 160.

As previously described, according to an exemplary embodiment, a user device, such as user device 155, may capture TC frames, allow the user to review and select TC frames, and/or share the selected TC frames with others. For example, user device 155 may receive television content from TCDN 105. According to an exemplary embodiment, user device 155 may provide a GUI that allows the user to capture a time window of TC frames from the television content. Alternatively, according to an exemplary embodiment, user device 155 may provide a GUI that allows the user to request the capture of a time window of TC frames to another device. The captured TC frames may be displayed on user device 155 to allow the user to review and select TC frames to share. According to an exemplary embodiment, user device 155 may allow the user to send or post the selected TC frames to the appropriate destination. According to another exemplary embodiment, TC selection information and/or destination information may be sent from user device 155 to another device (e.g., a network device in TCDN 105 or a device not included in TCDN 105). The other device may manage the sharing of the selected TC frames.

Figure 2:
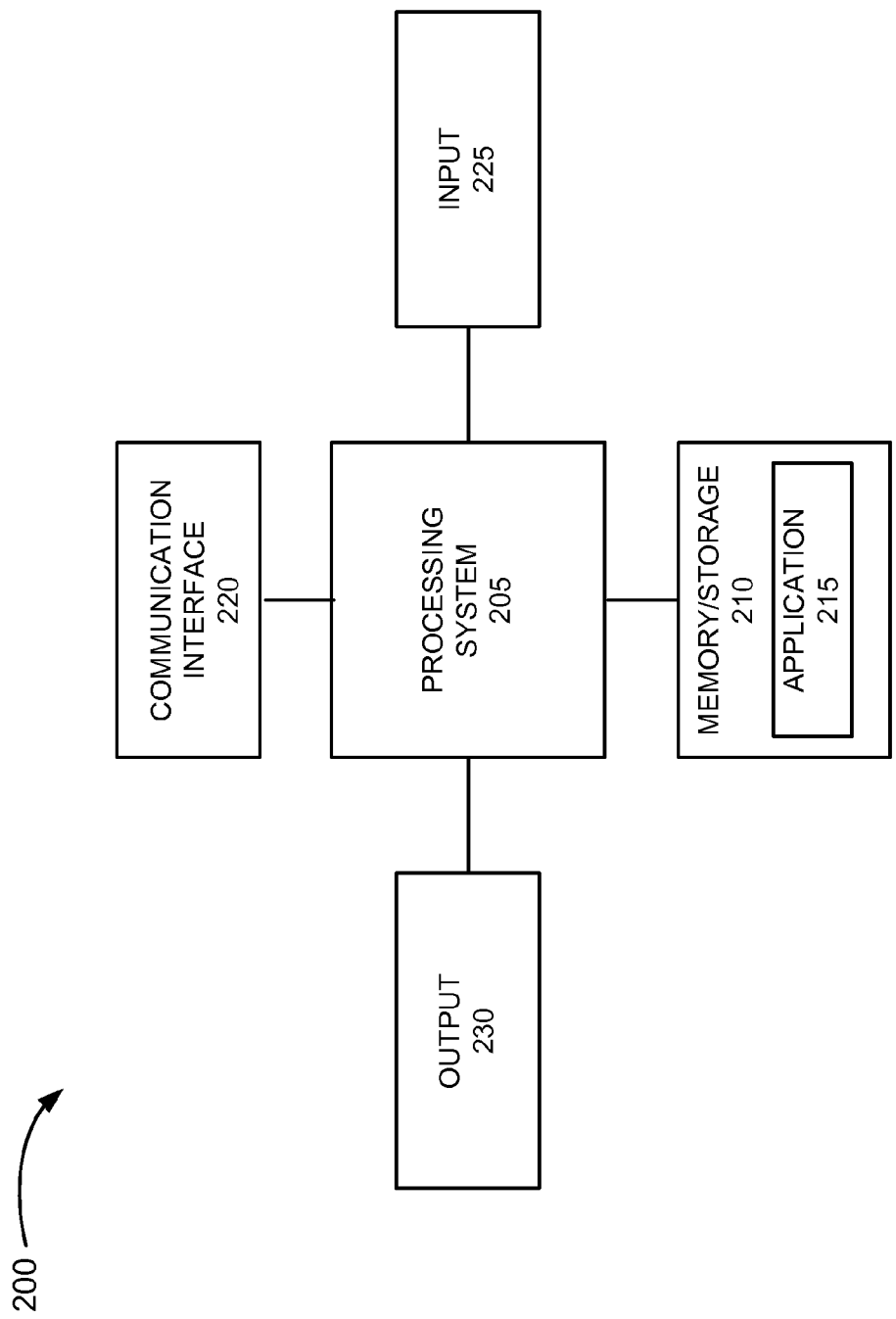
FIG. 2 is a diagram illustrating exemplary components of a device that may correspond to one or more of the devices in the environments depicted in FIGS. 1A-1H.

FIG. 2 is a diagram illustrating exemplary components of a device 200 that may correspond to one or more of the devices in environment 100 and/or environment 150. For example, device 200 may correspond to TCFC 110, storage 115, TC frame sharing device 120, TV 130, TCDN interface device 135, and/or remote device 140. As illustrated, according to an exemplary embodiment, device 200 may include a processing system 205, memory/storage 210 including an application 215, a communication interface 220, an input 225, and an output 230. According to other embodiments, device 200 may include fewer components, additional components, different components, and/or a different arrangement of components than those illustrated in FIG. 2 and described herein.

Processing system 205 may include one or multiple processors, microprocessors, data processors, co-processors, application specific integrated circuits (ASICs), controllers, programmable logic devices, chipsets, field programmable gate arrays (FPGAs), application specific instruction-set processors (ASIPs), system-on-chips (SOCs), and/or some other component that may interpret and/or execute instructions and/or data. Processing system 205 may control the overall operation or a portion of operation(s) performed by device 200. Processing system 205 may perform one or multiple operations based on an operating system and/or various applications (e.g., application 215). Processing system 205 may access instructions from memory/storage 210, from other components of device 200, and/or from a source external to device 200 (e.g., a network, another device, etc.).

Memory/storage 210 may include one or multiple memories and/or one or multiple secondary storages. For example, memory/storage 210 may include a random access memory (RAM), a dynamic random access memory (DRAM), a read only memory (ROM), a programmable read only memory (PROM), a flash memory, a phase-change memory (PCM), and/or some other type of storing medium (a computer-readable medium, a compact disk (CD), a digital versatile disk (DVD), etc.). Memory/storage 210 may include a hard disk (e.g., a magnetic disk, an optical disk, a magneto-optic disk, a solid state disk, etc.) or some other type of storing medium, along with a corresponding drive. Memory/storage 210 may be external to and/or removable from device 200, such as, for example, a Universal Serial Bus (USB) memory, a dongle, a hard disk, mass storage, off-line storage, etc.

The term "computer-readable medium," as used herein, is intended to be broadly interpreted to include, for example, a memory, a secondary storage, a CD, a DVD, or another type of tangible storing medium. Memory/storage 210 may store data, application(s), and/or instructions related to the operation of device 200.

Applications 215 may include software that provides various services and/or functions. For example, with reference to TCFC 110 and according to an exemplary embodiment, application 215 may include one or multiple applications for capturing TC frames from television content. Additionally, or alternatively, for example, with reference to TC frame sharing device 120 and according to an exemplary embodiment, application 215 may include one or multiple applications for sharing/providing TC frames to destinations. Additionally, or alternatively, applications 215 may include one or more applications associated with other devices to perform one or more processes described herein.

Communication interface 220 may permit device 200 to communicate with other devices, networks, systems, etc. Communication interface 220 may include one or multiple wireless interfaces and/or wired interfaces. Communication interface 220 may include one or multiple transmitters, receivers, and/or transceivers. Communication interface 220 may operate according to one or multiple protocols, standards, and/or the like.

Input 225 may permit an input into device 200. For example, input 225 may include a keyboard, a mouse, a microphone, a display, a touchpad, a button, a switch, an input port, voice recognition logic, fingerprint recognition logic, a web cam, and/or some other type of visual, auditory, tactile, etc., input component. Output 230 may permit an output from device 200. For example, output 230 may include a speaker, a display, a light, an output port, and/or some other type of visual, auditory, tactile, etc., output component.

As described herein, device 200 may perform processes in response to processing system 205 executing software instructions (e.g., application 215) contained in a computer-readable medium, such as memory/storage 210. By way of example, the software instructions may be read into memory/storage 210 from another computer-readable medium or from another device via communication interface 220. The software instructions stored in memory/storage 210 may cause processing system 205 to perform one or more processes described herein. Alternatively, for example, according to other implementations, device 200 may perform one or more processes described herein based on the execution of hardware (processing system 205, etc.), the execution of hardware and firmware, or the execution of hardware, software, and firmware.

As previously described, according to exemplary embodiments, TC frames may be captured and shared with others. For example, a TCDN and customer equipment may allow a user to capture TC frames, allow the user to select one or multiple TC frames from the captured TC frames, and share the selected one or multiple TC frames with other people. Alternatively, a user device or a combination of the user device with other devices may perform one or more of the processes for capturing and sharing TC frames. Described below are exemplary processes associated with the capturing and sharing of TC frames.

Figure 3A:
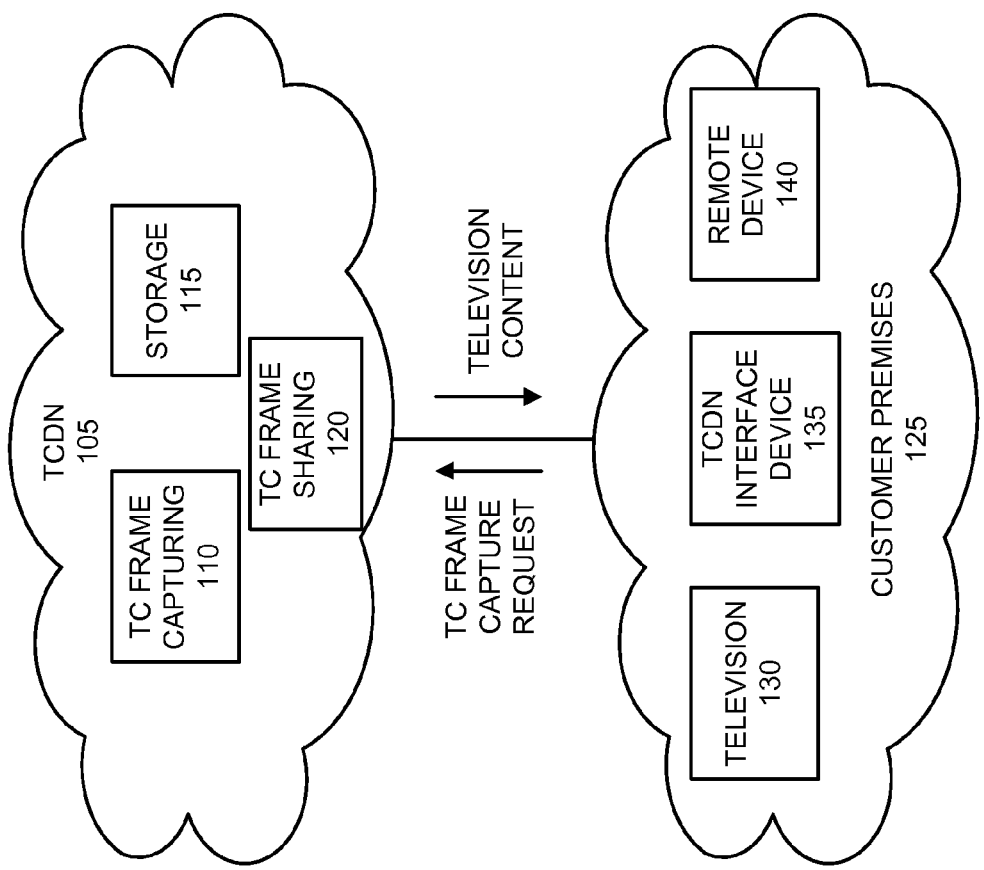
FIGS. 3A-3D are diagrams illustrating exemplary processes for capturing and sharing television content frames in the exemplary environments.

Referring to FIG. 3A, according to an exemplary embodiment, TCDN 105 may broadcast or provide television content to a user. In response to viewing the television content, the user may send a TC frame capture request to TCDN 105. For example, the user may cause TV 130 to display a GUI via remote device 140 to allow the user to request TC frame capture, or remote device 140 may include a TC frame capture request input.

According to an exemplary embodiment, the TC frame capture request may include one or more of the following parameters. For example, the TC frame capture request may include a TV content parameter (e.g., a TV channel, name of the TV content, and/or some other type of TV content identifier) to identify the television content with which captured TC frames are associated. Additionally, or alternatively, according to an exemplary embodiment, the TC frame capture request may include a time window duration parameter (e.g., 1 minute, 30 seconds, etc.) to indicate a time duration which captured TC frames are to be provided to the user. For example, as previously described, the time window of TC frames captured by TCDC 110 may be the same or different from a time window of TC frames from which the user wishes to review. Additionally, or alternatively, according to an exemplary embodiment, the TC frame capture request may include a timestamp parameter to indicate when the TC frame capture request was generated or received by TCDN interface device 135, remote device 140, etc. Additionally, or alternatively, according to an exemplary embodiment, the TC frame capture request may include a TC frame/time period parameter to indicate the number of TC frames or density of TC frames within a time period or time window (e.g., 3 TC frames/per second, 10 TC frames per second, etc.). Additionally, or alternatively, according to an exemplary embodiment, the TC frame capture request may include a forward/backward parameter to indicate that the time window of TC frames captured relate to a time period before or after the timestamp parameter. As previously described, according to other embodiments, the time window may be positioned elsewhere on a time line relative to the timestamp parameter (e.g., the time window may include a portion of time before the timestamp and a portion of time after the timestamp, etc.).

According to an exemplary embodiment, TCDN 105 may store user preferences related to TC frame capture and sharing. For example, the user preferences may include one or more of the parameters described above relating to the TC frame capture request. Alternatively, according to an exemplary embodiment, TCDN 105 may provide pre-defined values for one or more of the parameters described above relating to the TC frame capture request. As will be described further below, other types of parameters relating to the sharing of TC frames may be implemented as user preferences and/or as pre-defined by TCDN 105.

Figure 3B:
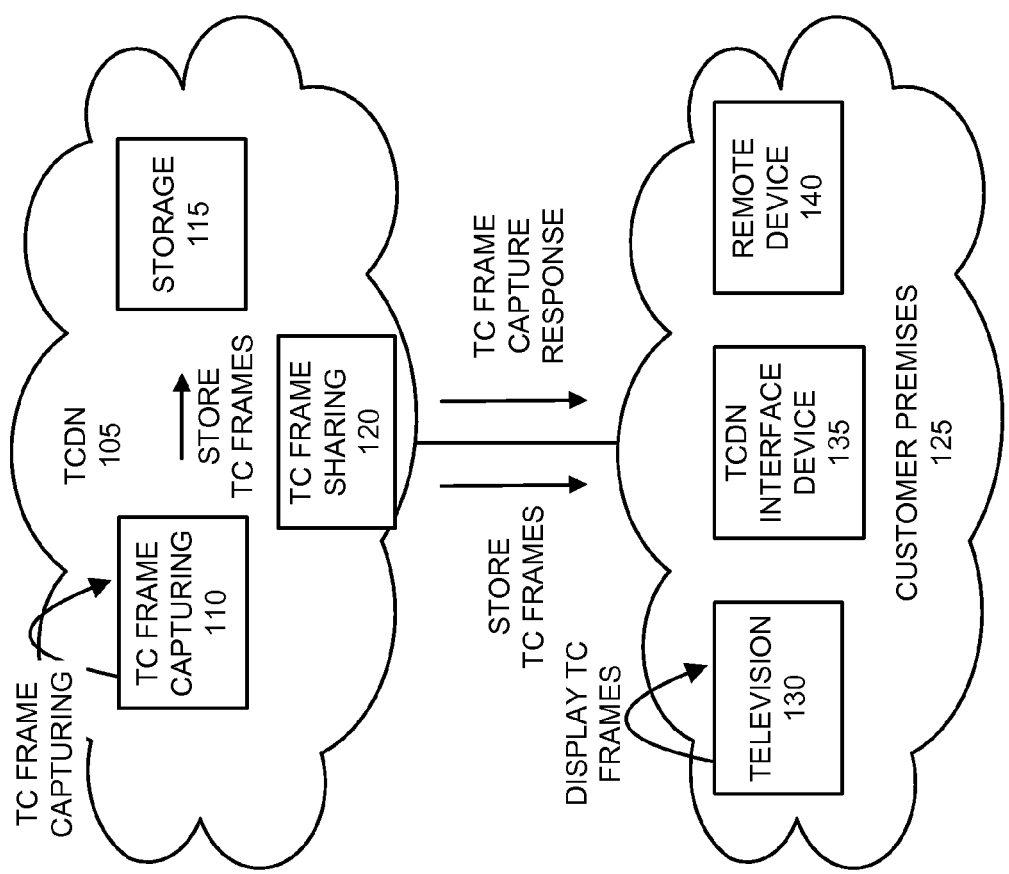

Referring to FIG. 3B, TCFC 110 may capture TC frames. According to an exemplary embodiment, TCFC 110 may continuously capture TC frames without regard to receiving a TC frame capture request. The time window of TC frames captured may be, for example, predefined by TCDN 105, based on user preferences, or some combination thereof.

Additionally, the number of TC frames/time window may be pre-defined by TCDN 105, based on user preferences, or some combination thereof. According to an exemplary embodiment, TCFC 110 may select a time window of captured TC frames and the number TC frames to store based on receiving the TC frame capture request. TCFC 110 may store the captured TC frames responsive to the TC frame capture request in storage 115 and/or on a device (e.g. TCDN interface device 135, remote device 140, etc.) in customer premises 125.

According to an exemplary embodiment, a TC frame capture response may be sent from TCDN 105 to the user via TCDN interface device 135. For example, the TC frame capture response may include television content (e.g., a GUI) that allows the user to review the captured TC frames, select from the captured TC frames, and select destinations for selected TC frames. According to an exemplary embodiment, the GUI may allow the user to manage the storing of the captured TC frames (e.g., naming folders, etc.). Additionally, or alternatively, according to an exemplary embodiment, the GUI may label each TC frame (e.g., by number or some other identifier). Additionally, or alternatively, according to an exemplary embodiment, the GUI may include a timeline and a marker in which the marker indicates where on the timeline a particular TC frame that the user is viewing corresponds. Additionally, or alternatively, according to an exemplary embodiment, the GUI may include various icons, menus, or other objects to select destinations, communication addresses, Internet sites, etc.

Figure 3C:
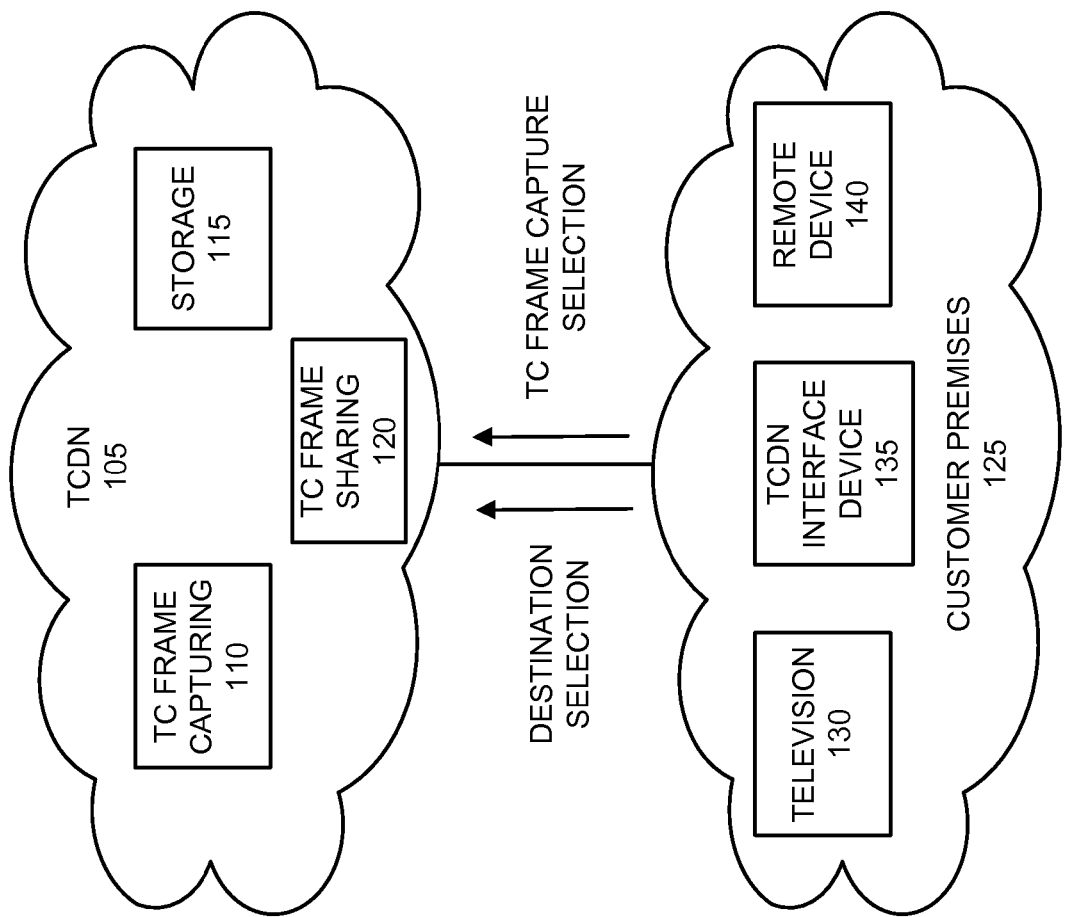

Referring to FIG. 3C, according to an exemplary embodiment, the user may select TC frame(s) and destination(s) for the TC frame(s) in which such information may be sent to TCDN 105 (e.g., TCFC 110, etc.). According to other embodiments, although not illustrated, selection of TC frame(s) information and/or destination(s) for the TC frame(s) information may not be sent to TCDN 105. For example, remote device 140 and/or TCDN interface device 135 may receive TC frame selection information and/or destination selection information and send the TC frame(s) to the appropriate destination(s).

Figure 3D:
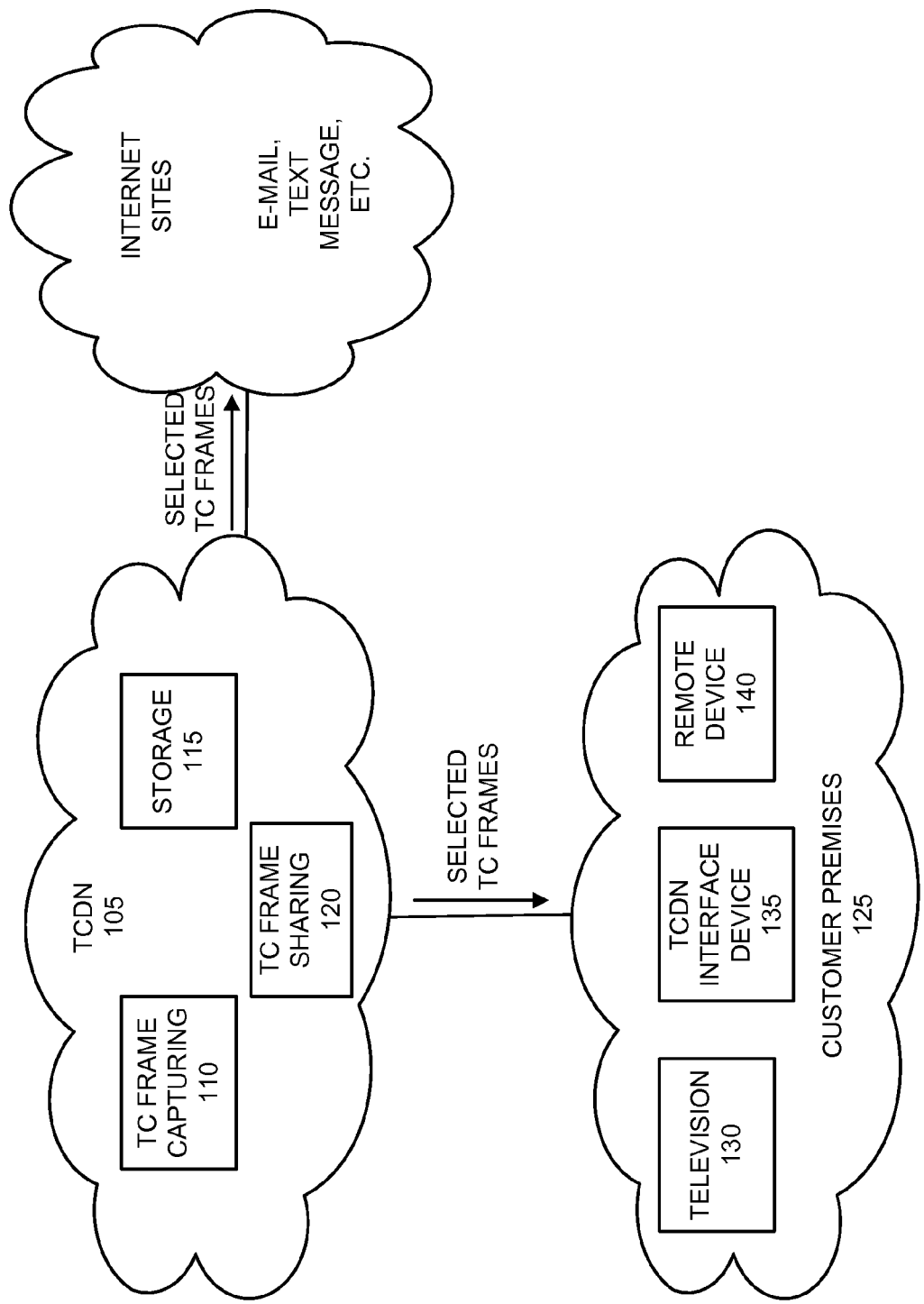

As illustrated in FIG. 3D, the selected TC frame(s) may be sent to various destinations. For example, according to an exemplary embodiment, TC frame sharing device 120 may manage the sharing of TC frames selected by the user. By way of example, the selected TC frames may be sent to Internet sites, sent to various individuals as an e-mail or text message (e.g., MMS message, etc.), or sent to other users (e.g., subscribers of the TSP). According to some embodiments, TCDN 105 may include one or more types of communication servers (e.g., e-mail servers, MMS servers, etc.) for its users. According to other embodiments, the communication servers may be outside of TCDN 105.

As previously described, according to an exemplary embodiment, TC frame sharing 120 may perform various security measures to access and log into various user accounts, perform user verification, etc. TC frame sharing device 120 may perform other processes (e.g., graphical processing), packaging of TC frames with other data (e.g., text, audio, etc.). According to other embodiment, although not illustrated, devices in customer premises 125 may perform one or more of the functions described as being performed by TC frame sharing device 120.

Additionally, according to still other embodiments and with reference to exemplary environment 150, user device 155 or user device 155 in combination with other devices (e.g., device(s) in TCDN 105, device(s) not included in TCDN 105) may perform processes analogous to those described herein.

Figure 4:
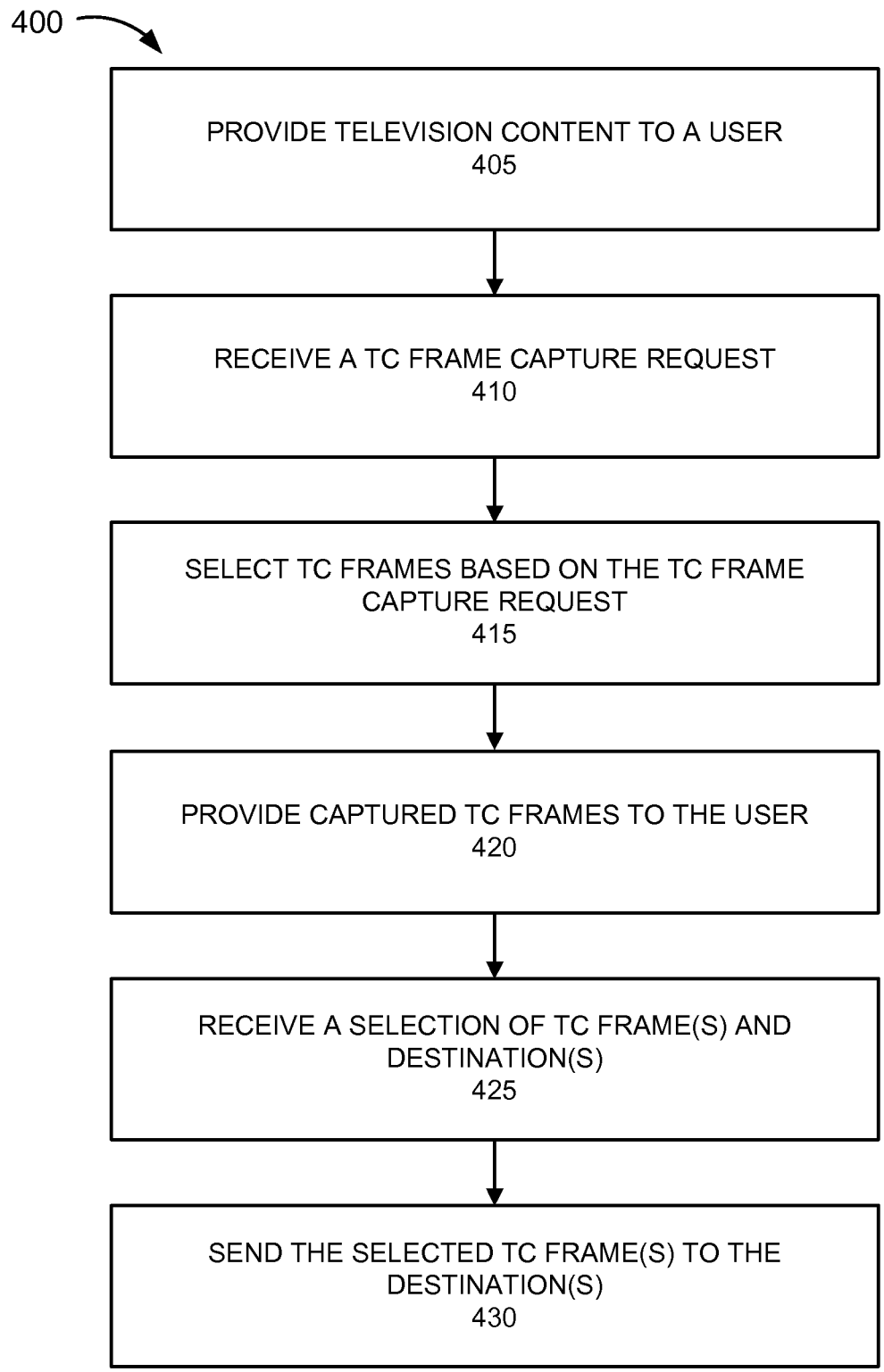
FIG. 4 is a flow diagram illustrating an exemplary process for television content frame capturing and sharing.

FIG. 4 is a flow diagram illustrating an exemplary process 400 for providing TC frame capturing and sharing.

Television content may be provided to a user (block 405). For example, as previously described, TCDN 105 may provide television content to a user. The user may view the television content on a display, such as, for example, a television, a user device, etc.

A TC frame capture request may be received (block 410). For example, as previously described, the user may request the capturing of TC frame(s). By way of example, the user may input a TC frame capture request via remote device 140 or user device 155.

TC frame(s) may be selected based on the TC frame capture request (block 415). For example, as previously described, TCFC 110 may capture TC frame(s) based on the TC frame capture request. Alternatively, user device 155 may capture TC frame(s) based on the TC frame capture request.

Captured TC frame(s) may be provided to the user (block 420). For example, as previously described, the user may have an opportunity to review the captured TC frame(s) and select TC frame(s) to share. Additionally, the user may have an opportunity to select destination(s).

A selection of TC frame(s) and destination(s) may be received (block 425). For example, as previously described, the user may input the TC frame and destination selections via remote device 140 or user device 155. The selections may be provided to TCDN 105 (e.g., sharing device 120) or not (e.g., user device 155).

The TC frame(s) selected may be sent to the selected destination(s) (block 430). For example, as previously described, TC frame sharing device 120 or user device 155 may send the selected TC frame(s) to the appropriate destination(s).

Although FIG. 4 illustrates an exemplary process 400 for TC frame capturing and sharing, according to other embodiments, process 400 may include additional operations, fewer operations, and/or different operations than those illustrated in FIG. 4 and described. Additionally, while process 400 is described with reference to exemplary devices (e.g., remote device 140, user device 155, etc.), according to other embodiments, block(s) described in process 400 may be performed by a device or combination of devices other than those specifically mentioned.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIG. 4, the order of the blocks may be modified in other implementations. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processing system 205, etc.), a combination of hardware and software (e.g., application 215), a combination of hardware and firmware, a combination of hardware, firmware, and software, or software. The embodiments have been described without reference to the specific software code since software can be designed to implement the embodiments based on the description herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

No element, act, or instruction described in the present application should be construed as critical or essential to the implementations described herein unless explicitly described as such.

What is claimed is:

1. A method comprising:
    displaying, via a user device, television content to a user of the user device;
    receiving, via the user device, during the displaying, a television content capture request pertaining to the television content, wherein the television content capture request includes a parameter that indicates a time window during which to capture television content frames of the television content, and store the television content frames, and wherein the television content frames are a portion of the television content, and wherein a duration of the time window is user configurable and a beginning of the time window relative to the receipt of the television content capture request is user configurable, and wherein the television content capture request includes another parameter that indicates a density of television content frames to capture within the time window, wherein the density of television content frames is different from a density of the television content frames provided during the displaying;
    capturing and storing the television content frames based on the television content capture request;
    displaying, via a user interface, to the user, the television content frames based on the capturing and the storing, wherein the television content frames are displayed in a manner that allows the user to select one and multiple television content frames; receiving, via the user interface, a user selection of a television content frame of the television content frames;
    receiving, via the user interface, a user selection of a destination to send the television content frame; and
    sending the television content frame to the destination.

2. The method of claim 1, further comprising:
    selecting the time window from which to capture the television content frames from the television content based on the television content capture request.

3. The method of claim 1, further comprising:
    generating a message that includes the television content frame and at least one of text or audio data, wherein the generating includes watermarking the television content frame.

4. The method of claim 1, wherein the destination includes at least one of an Internet site, an e-mail address, a text messaging address, or a user group address, and wherein the other parameter indicates a number of television content frames to capture, and wherein the number of television content frames is user configurable.

5. The method of claim 1, further comprising:
    receiving a comment from the user relating to the television content frame; and wherein the sending comprises:
    sending the comment with the television content frame to the destination.

6. The method of claim 1, wherein the beginning of the time window begins subsequent to the receipt of the television content capture request.

7. The method of claim 1, further comprising:
    labeling each television content frame of the television content frames, and wherein the displaying of the television content frames includes displaying a label for each television content frame.

8. The method of claim 1, wherein the television content includes a live broadcast of television content, and wherein the television content capture request includes another parameter that indicates a timestamp of when the television content capture request is received and the beginning of the time window begins before the timestamp.

9. A device comprising:
    a communication interface;
    a memory, wherein the memory stores instructions; and
    a processor, wherein the processor executes the instructions to:
    display television content to a user;
    receive, during a display of the television content, a television content capture request that indicates to capture television content frames of the television content, wherein the television content capture request includes a parameter that indicates a time window during which to capture television content frames of the television content and store the television content frames, and wherein the television content frames are a portion of the television content, and wherein a duration of the time window is user configurable and a beginning of the time window relative to the receipt of the television content capture request is user configurable, and wherein the television content capture request includes another parameter that indicates a density of television content frames to capture within the time window, wherein the density of television content frames is different from a density of the television content frames provided during the displaying; capture and store the television content frames based on the television content capture request; display, via a user interface, to the user, the television content frames, wherein the television content frames are displayed in a manner that allows the user to select one and multiple television content frames;
    receive, via the user interface, a user selection of a television content frame of the television content frames; receive, via the user interface, a user selection of a destination to send the television content frame; and send, via the communication interface, the television content frame to the destination.

10. The device of claim 9, wherein the processor further executes the instructions to:
    generate a message that includes the television content frame and at least one of text inputted by the user or audio data that includes a commentary pertaining to the television content frame.

11. The device of claim 9, wherein the other parameter indicates a number of television content frames to capture, and wherein the processor further executes the instructions to:
    select the number of television content frames to capture within the time window based on the television content capture request, wherein the number of television content frames is greater than one.

12. The device of claim 9, wherein the time window includes a time period within which television content frames of the television content have already been displayed.

13. The device of claim 12, wherein the time window includes a time period within which television content frames of the television content have yet to be displayed.

14. The device of claim 9, wherein the processor further executes the instructions to: label each television content frame of the television content frames, and wherein the displaying of the television content frames includes displaying a label for each television content frame.

15. The device of claim 9, wherein the processor further executes the instructions to:
provide a user interface that allows the user to create and name folders that can be used to store television content frames.

16. The device of claim 9, wherein the television content is one of a television program, a movie, or a video-on-demand program.

17. A non-transitory storage medium comprising instructions executable by a processor of a computational device, which when executed by the processor, cause the computational device to: display television content to a user; receive, during a display of the television content, a television content capture request includes a parameter that indicates a time window during which to capture television content frames of the television content, wherein the television content capture request indicates to capture television content frames of the television content, and store the television content frames, and wherein the television content frames are a portion of the television content, and wherein a duration of the time window is user configurable and a beginning of the time window relative to the receipt of the television content capture request is user configurable, and wherein the television content capture request includes another parameter that indicates a density of television content frames to capture within the time window, wherein the density of television content frames is different from a density of the television content frames provided during the displaying; capture and store the television content frames based on the television content capture request; display to the user the television content frames, wherein the television content frames are displayed in a manner that allows the user to select one and multiple television content frames; receive a user selection of a television content frame of the television content frames; receive a user selection of a destination to send the television content frame, wherein the destination includes a device other than the computational device; and send the television content frame to the destination based on the user selection of the destination.

18. The non-transitory storage medium of claim 17, further comprising instructions, which when executed by the processor, cause the computational device to:
generate a message that includes the television content frame and at least one of text inputted by the user or audio data.

19. The non-transitory storage medium of claim 17, wherein the time window includes a time period within which television content frames of the television content have already been displayed.

20. The non-transitory storage medium of claim 17, further comprising instructions, which when executed by the processor, cause the computational device to: select the time window from which to capture the television content frames from the television content based on the television content capture request.

* * * * *